(12) United States Patent  (10) Patent No.: US 8,820,855 B2
Cadaddu  (45) Date of Patent: Sep. 2, 2014

(54) HYDRAULIC BRAKING DEVICE HAVING SECURITY PROVISIONS, FOR A FARM TRACTOR OR A SIMILAR VEHICLE

(75) Inventor: Leonardo Cadaddu, Crema (IT)

(73) Assignee: VHIT S.p.A. Unipersonale, Offanengo (IT)

(*) Notice: Subject to any disclaimer, the term of this patent is extended or adjusted under 35 U.S.C. 154(b) by 839 days.

(21) Appl. No.: 12/812,512

(22) Filed: Jul. 12, 2010

(65) Prior Publication Data

US 2010/0289324 A1    Nov. 18, 2010

(30) Foreign Application Priority Data

Jan. 16, 2008  (IT) ............................... TO2008A0032

(51) Int. Cl.
*B60T 11/21*   (2006.01)
(52) U.S. Cl.
USPC ......................................... 303/9.61; 188/345
(58) Field of Classification Search
USPC ............ 303/9.61, 113.2, 113.3, 113.5, 114.2; 188/345, 106 P
See application file for complete search history.

(56) References Cited

U.S. PATENT DOCUMENTS 3,927,915 A     12/1975  Adachi
2004/0212248 A1  10/2004  Cadeddu

FOREIGN PATENT DOCUMENTS

| DE | 92 04 417 U1 | 6/1992 |
|----|----|----|
| EP | 1 457 400 A1 | 9/2004 |
| GB | 2 201 743 A | 9/1988 |
| WO | WO 2006/103049 A1 * | 10/2006 |

OTHER PUBLICATIONS

International Search Report, dated Apr. 19, 2010, from corresponding PCT application.

* cited by examiner

*Primary Examiner* — Bradley King
*Assistant Examiner* — Vu Q Nguyen
(74) *Attorney, Agent, or Firm* — Young & Thompson

(57) ABSTRACT

A braking system for farm tractors and similar vehicles, has a differential braking system and a hydraulic system for the braking assistance forming a system unit (H) which includes two circuit branches (H1,H2), each circuit branch operating the braking with respect to one side of the vehicle. To the system unit are applied, through connection interfaces (36, 37), two control units (C1,C2), each control unit including an electrovalve (20) and a distributor (24) operated by the electrovalve, each distributor controlling the operation of the system unit (H) with respect to one of the circuit branches, and each electrovalve being singularly controlled by an electronic control circuit (EL) provided with sensors of the main vehicle parameters, such as a sensor (V) of the vehicle speed, sensors (R) of the speed of singular wheels, sensors (P) of the positions of the braking pedals and a sensor (A) of the position of the accelerator pedal.

14 Claims, 4 Drawing Sheets

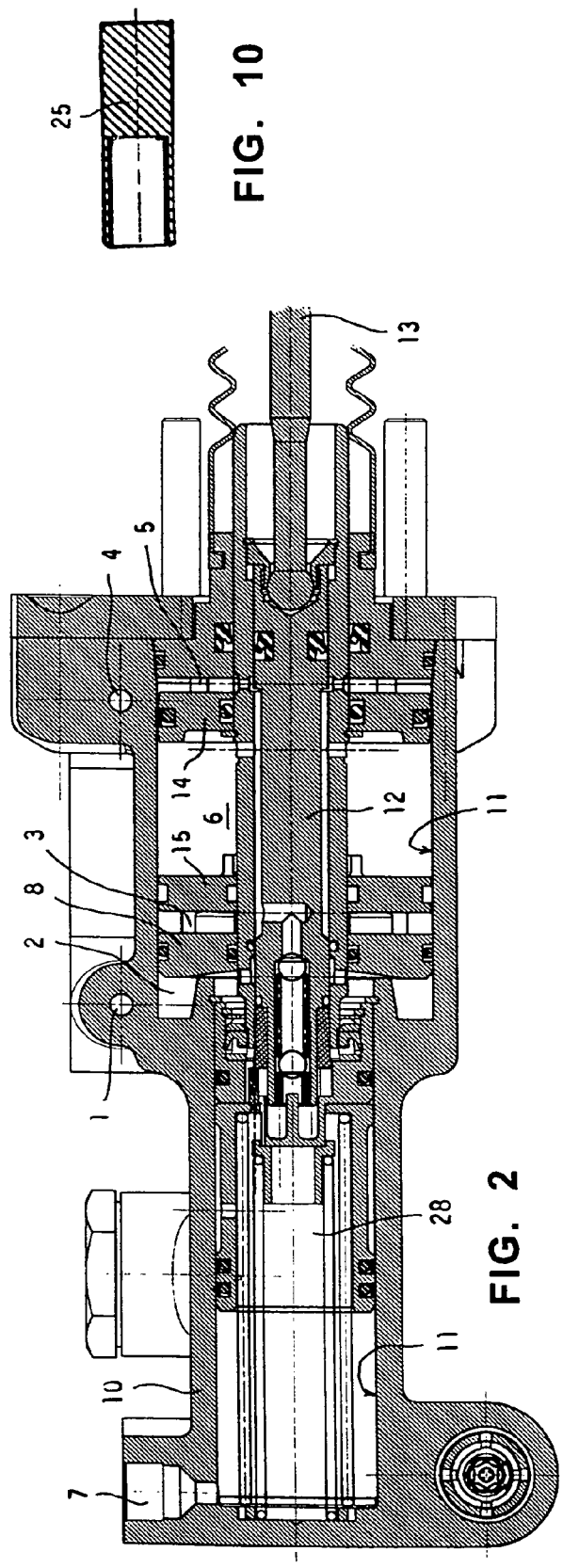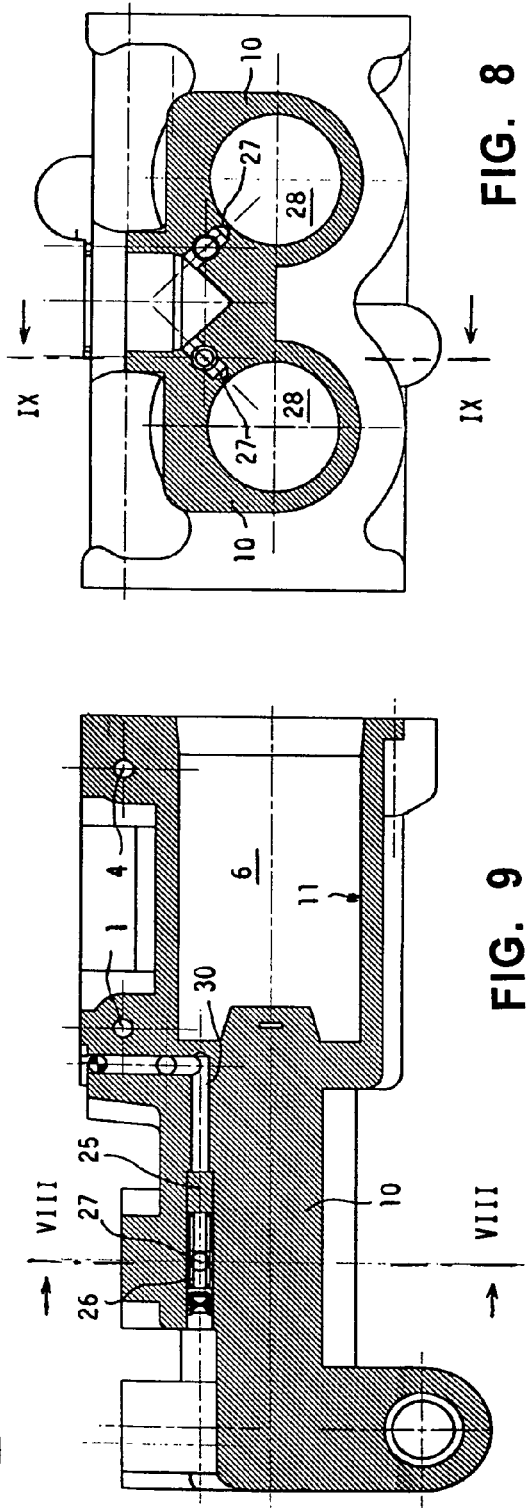

HYDRAULIC BRAKING DEVICE HAVING SECURITY PROVISIONS, FOR A FARM TRACTOR OR A SIMILAR VEHICLE

BACKGROUND OF THE INVENTION

1. Field of the Invention

The subject of this invention is a hydraulic braking device, mainly intended for a farm tractor or a similar vehicle, which is characterized by the presence of special provisions destined to provide security functions.

2. Description of the Related Art

In some vehicles, particularly the farm tractors and like vehicles, the hydraulic braking system includes two master cylinders operating as pumps, which are controlled by two separate braking pedals. Each of these master cylinders operates the braking of one of the rear side wheels (left-hand and right-hand wheels) of the vehicle, which are the driving wheels. This arrangement has the purpose of allowing a unilateral braking of the side wheels, for example in order to help the vehicle rotation by the U-turns when a field is being worked along adjacent lanes which are run in alternatively opposite directions. When, on the contrary, a bilateral braking is commanded by operating both the braking pedals, in general the system could be unbalanced. because the two separate braking circuits take up different oil quantities, and the result would be a similarly unbalanced braking. In order to prevent this drawback, a balancement channel is provided that mutually communicates the two braking circuits when both the braking pedals are operated simultaneously. The balancing function is effected by balancing valves installed on the pistons of the two master cylinders, these valves being normally closed and being opened after the pistons have covered a preestablished stroke.

Each master cylinder of this braking system is a part of a braking device which may comprise arrangements for the braking assistance. For the purposes of this invention it will be mainly taken in consideration a hydraulic device improved to the aim of increasing the braking sensitivity, such as it has been described in detail in the European Patent No. 1.457.400. This hydraulic braking device comprises a master cylinder and a hydraulic servosystem for braking assistance, including a body wherein there is sealingly and slidably mounted a hydraulic assistance piston which mutually separates a first chamber and a second chamber, these chambers being put in mutual communication and being filled with a hydraulic fluid under high pressure at rest, whereas at the time of a braking operation the communication between these two chambers is interrupted and a communication between the second chamber and the master cylinder is opened, thus causing the displacement of the assistance piston.

Another security arrangement used in a braking system of this kind is a function which, in the case of a default of the high pressure oil circuit, ensures by the muscular force of the user a braking that cannot be assisted but is usually sufficient for an emergency braking.

The modern farm tractors may be intended to attain high speeds, up to 80 km/h and over, when they are running on road, and therefore there are needed some active and passive security provisions that are known for the road vehicles but, in the past, were not considered needed for these vehicles. For example, some regulations impose that, for the sake of security, the tractors attaining speeds over 40 km/h be provided with a braking device with double circuit.

Other security provisions used in the road vehicles comprise, for example, a function of regulation of the slip in traction (ASR=Acceleration Slip Regulation), a function preventing the wheel blockage in braking (ABS=Anti-lock Braking System), and a function of stability control (ESP=Electronic Stability Program). These security functions, or some of them, could be very useful for the farm vehicles too, however they have not yet been applied in the farm tractors and similar vehicles, mainly because their adoption should have encountered heavy difficulties in view of the special braking system present in these vehicles.

BRIEF SUMMARY OF THE INVENTION

With reference to the braking systems for farm tractors and similar vehicles that are equipped with a differential braking system and also with a hydraulic system for braking assistance (technically named hydrobooster), the main object of this invention is to introduce in said systems at least one additional security function, such as a function of regulation of the slip in traction (ASR), or a function preventing the wheel blockage in braking (ABS), or a function of stability control (ESP), or even other functions, and preferably several of these functions. As it may be understood, the introduction of these functions ensures a further important security for the vehicles of the considered kind, when they are suitable for attaining high speeds on road.

Another object of the invention is to ensure a correct system operation in the different operating condition that may occur. Still another object of the invention is to attain the stated objects by reducing at a minimum the complication and the encumbrance of the system, with particular reference to its installation onto the vehicle. Finally, it is an object of this invention to limit at a minimum the expenses involved in the provision of this improved braking system.

In a braking system for farm tractors and similar vehicles which comprise a differential braking system and a hydraulic system for the braking assistance forming a system unit which includes two circuit branches, each circuit branch operating the braking with respect of one side of the vehicle, the main invention object is attained because to said system unit having two branches are applied, through connection interfaces, two control units, each control unit including an electrovalve and a distributor operated by said electrovalve, each said distributor controlling the operation of the system unit with respect to one of the circuit branches, and each said electrovalve being singularly controlled by an electronic control circuit provided with sensors of the main vehicle parameters.

The control electronic circuit may be of a substantially known type and may be operated by a control logic of the so-called "ECU" type, which takes into account the main vehicle parameters observed by means of per se known sensors, such as sensors of the operation of the braking pedals, a sensor of the vehicle speed, sensors of the rotational velocity of singular wheels, acceleration sensors and other possible sensors, and is suitable for ensuring a correct braking in any run condition, whereby the vehicle can be dominated in any condition.

This invention finds its preferred application in those braking systems in which the assistance to braking is provided by a source of high pressure fluid, and in such applications the pressure used for operating the one or the other of the additional security functions, or several such functions, is the same pressure provided by the high pressure source supplying the assistance system.

Preferably the electrovalve of each control unit is a three-positions electrovalve, a first position being a rest position, a second position being a position of operation of the ASR function, and the third position being a position of operation of the ABS function.

It is of advantage that said electrovalve has its first position located in center and the second and third positions displaced in opposite directions with respect to said central first position.

Preferably, the distributor of each control unit has a series of gates that are mutually connected in various manners by a distribution slide operated by the respective electrovalve, each said port being connected to a chamber or passageway of the respective hydraulic device of the system unit.

Preferably, the distributor of each control unit, when it is in the rest position, does not modify in any manner the connections of the chambers of the respective hydraulic device.

On the contrary, the distributor of each control unit, when it is in the position for activating the ASR function, modifies the connections of the chambers of the respective hydraulic device, by isolating from the system the discharge passageway and commutating the connection of the chamber connected to the wheel having the lower adherence from the discharge position to a pressure position.

And the distributor of each control unit, when it is in the position for activating the ABS function, modifies the connections of the chambers of the respective hydraulic device, by commutating the connection of the intermediate chamber from the condition of communication with the discharge passageway to a condition of communication with the high pressure supply passageway, and connecting the assistance chamber to the discharge passageway, in order to generate an antagonist force aiming to reduce, even to the annulment, the assistance effect and, if needed, even to counteract against the muscular force exerted by the driver.

Each master cylinder of the system unit comprises a device suitable for intercepting the balancement channel extending between the two master cylinders, when a pressure is sent to a chamber of a master cylinder in order to activate an ASR or ABS function, whereby it is then allowed to apply different pressures to the braking circuits of the two vehicle sides.

It is of advantage that said interception device includes a shutter with a spring returned piston which is subjected through a pipe to the pressure present in the intermediate chamber of the master cylinder, and intercepts the balancement channel by displacing against the spring action.

The braking device of the invention may operate the braking action only onto the rear wheels of the vehicle, but it may also be arranged for operating the braking of the front wheels or the wheels of a trailer too. In such a case it may be equipped with a disconnection valve which shuts out the braking of the front vehicle wheels or the trailer wheels when a unilateral braking is effected.

These and other features, objects and advantages of the subject of this invention will appear more clearly from the following description of an embodiment, which has the character of a non-limiting example, wherein both the ASR and the ABS functions are foreseen. It is however intended that the invention may be embodied by providing only one of these functions or even other functions. With reference to the appended drawings:

BRIEF DESCRIPTION OF THE DRAWINGS

FIG. 2 shows a longitudinal section of one of the master cylinders operating as pumps, forming a branch of the two-branches system unit of the braking system.

FIGS. 8 to 10 refer to an arrangement of the master cylinders for interrupting the balancement action when takes place the intervention of one of the additional functions of regulation of the slip in traction (ASR) and/or of prevention of the wheel blockage in braking (ABS).

DETAILED DESCRIPTION OF THE PREFERRED EMBODIMENTS

Figure 1:
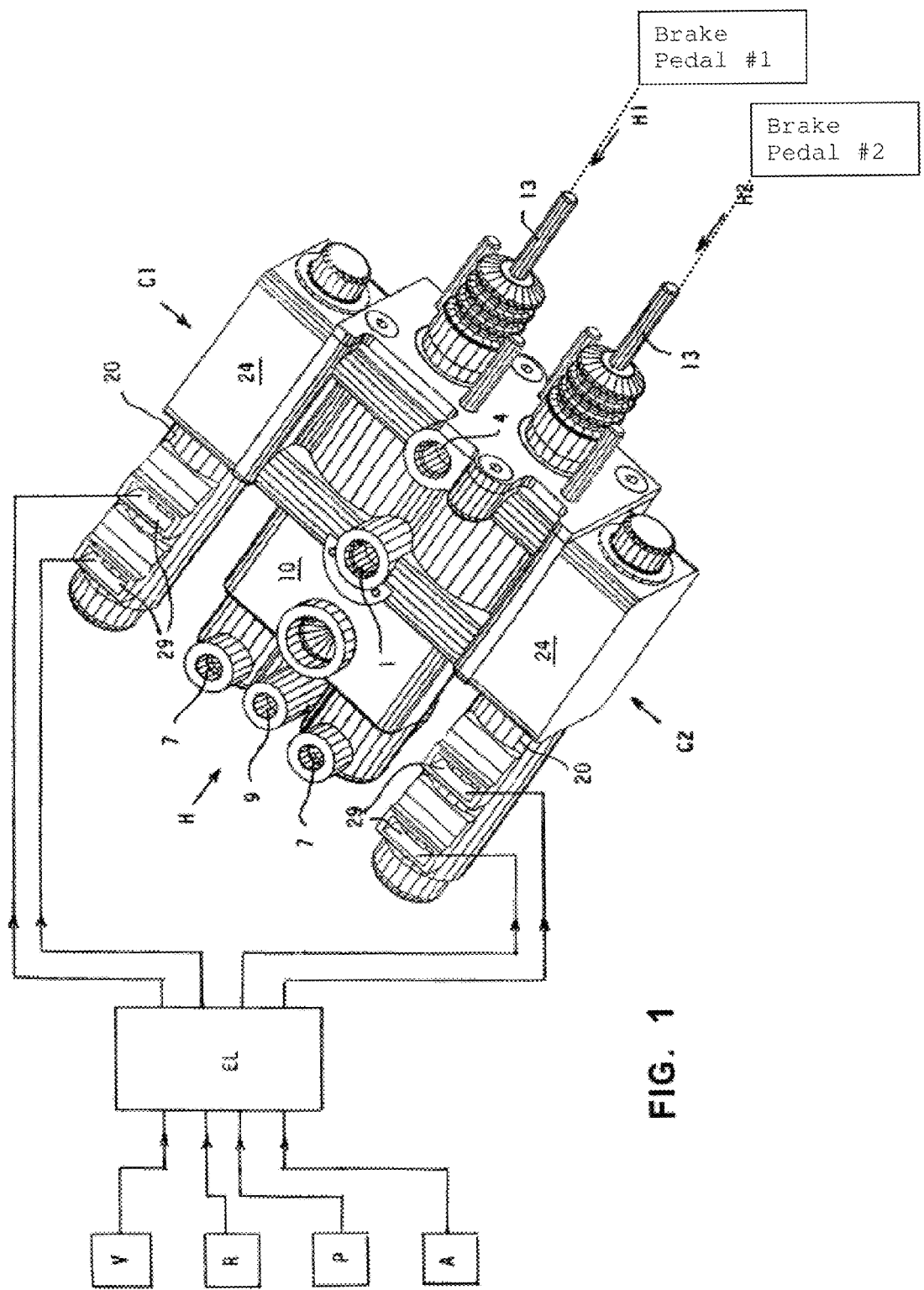
FIG. 1 shows a perspective view of a braking device according to the invention and the block diagram of an electronic control circuit connected to the braking device.

With reference to FIG. 1, there is represented in perspective the braking device according to the invention, which comprises a central unit H (so-called hydrobooster) formed by the coupling of two hydraulic devices H1 and H2, each substantially corresponding to the hydraulic device described in the European Patent No. 1.457.400. This device is summarily described here, and for the details of its structure and operation reference is made to the cited European Patent No. 1.457.400.

FIG. 2 shows a section of one of the two hydraulic braking devices H1 and H2. This device comprises a body 10 wherein there is made a bore 11 having two diameters, which in the rear portion forms a chamber 6 of larger diameter forming a hydraulic braking servomotor, and in the front portion of reduced diameter forms a master cylinder operating as a pump, connected through a connection 7 to the brake of one of the vehicle wheels. In the bore 11 slides a control piston 12 driven by a command shaft 13 that ends at a braking pedal (not shown). In chamber 6, around the control piston 12 is slidingly mounted an assistance piston 14, behind which a chamber 5 is normally connected by a passageway 4 to a high hydraulic pressure source (not shown) intended to supply the assistance. Further two chambers, a chamber 2 inside the bore 11 and an intermediate chamber 3, are separated the one from the other by an annular piston 8 and, at rest, they are connected to a discharge passageway 1. The intermediate chamber 3 is separated from chamber 6 by a movable member 15. At rest, in chamber 6 is present the same pressure that is present in chamber 5 but, when the control piston 12 is operated, it controls openings which modulate the pressure in chamber 6, thus causing the intervention of the assistance, as it is described in detail in the European Patent No. 1.457.400.

According to the invention, as already stated, and as it appears from FIG. 1, to the system unit H having two branches are applied two control units C1 and C2, and each of them, under the command of an electronic control circuit EL, modifies the behavior of the system unit H with reference to the braking of the wheels situated at one side of the vehicle, when it is required the intervention of a function ASR, ABS or other function effected through the braking control. In order to accomplish its function, the electronic control circuit EL gets signals from several sensors, such as a sensor V of the vehicle speed, sensors R of the rotational velocity of the wheels, sensors P of the operation of the braking pedals and sensors A of acceleration. The electronic control circuit EL sends its control signals to the electric connections 29 of the electrovalves included within the control units C1 and C2.

Figure 3:
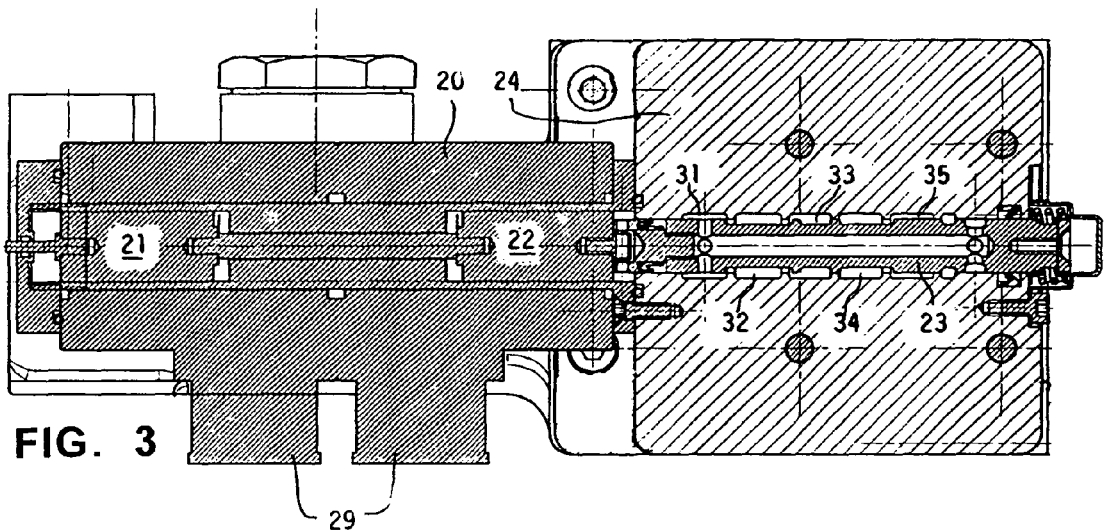
FIG. 3 shows a diagrammatic section of one of the two control units applied to the system unit, comprising an electrovalve and a distributor, represented in the rest condition.
Figure 6:
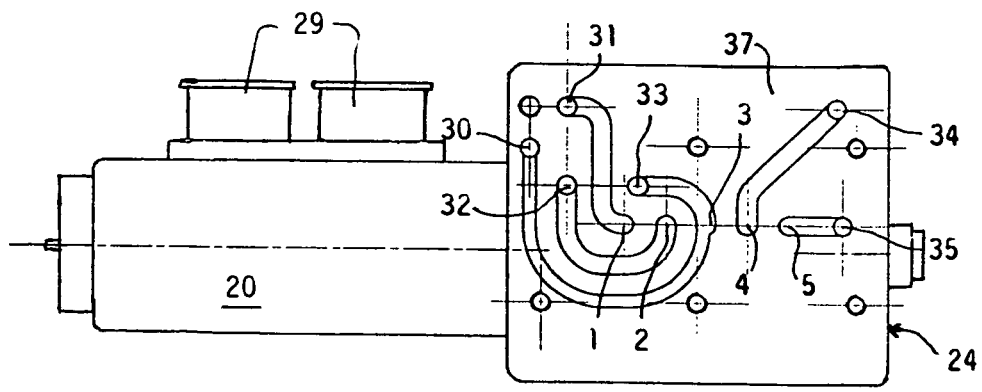
FIG. 6 shows a view of a control unit having an interface for communication with the system unit.

FIG. 3 diagrammatically shows the longitudinal section of one of the two control units C1 and C2, represented in the rest condition. This unit comprises an electrovalve body 20 wherein are housed two magnetic cores 21 and 22, which are mutually coupled and are operated by respective electric windings (not shown) having electric connections 29. The magnetic cores 21 and 22 are intended for being subjected to displacements in the opposite directions with respect to a central rest position shown in FIG. 3. The group of magnetic cores 21 and 22 operates corresponding displacements of a distribution slider 23 slidingly mounted within a distribution body 24. The slider 23 cooperates with five ports 31, 32, 33, 34, 35 formed in the body 24, by modifying the mutual connections thereof, as it will clarified later on. The five ports 31, 32, 33, 34, 35 are connected, in this order, to the chambers 1, 2, 3, 4, 5 of the corresponding hydraulic device (H1 or H2) of the system unit H. This connection is done through passageways provided in the body of the apparatuses and ending at an interface 37 of the distributor body 24 (FIG. 6) and at a corresponding interface 36 (FIG. 7) of the two interfaces present at the two sides of the body 10 of the system unit with two branches. In said interfaces 36 and 37 are hollowed several channels connecting the outlets of the passageways. For the sake of clarity these outlets are designed by the same reference numbers 1, 2, 3, 4, 5 and 31, 32, 33, 34, 35 that designate the chambers of the master cylinder and the ports of the distributor, from which come the corresponding passageways. Therefore, port 31 is a discharge port communicating with the discharge passageway 1, port 32 communicates with the inner chamber 2 of bore 11 of the hydraulic device, port 33 communicates with the intermediate chamber 3, port 34 is in communication, through passageway 4, with the supply of high pressure for assistance, and port 35 communicates with the assistance chamber 5. Moreover, the intermediate chamber 3 is in communication with a passageway 30 which will be defined later on, serving for a function of balancement suppression.

In this rest condition, the control unit C1 or C2 does not modify the behavior of the corresponding branch of the system unit 10, which therefore operates in the same way as if no control unit were present. This is the condition of normal run of the vehicle.

It will now be described the function of regulation of the slip in traction (ASR), whose addition to a hydrobooster is one of the objects of the invention.

The farm tractors, when they are operating on field, can take advantage of the differential blockage that solves the adherence problems when they are encountered, but this is not possible on road. On the road, when a different adherence to the land arises for the driving wheels, the torque which can be transmitted is the lesser one, and some slips can take place. In this case may be suitable an action of regulation of the slip in traction (ASR).

Figure 4:
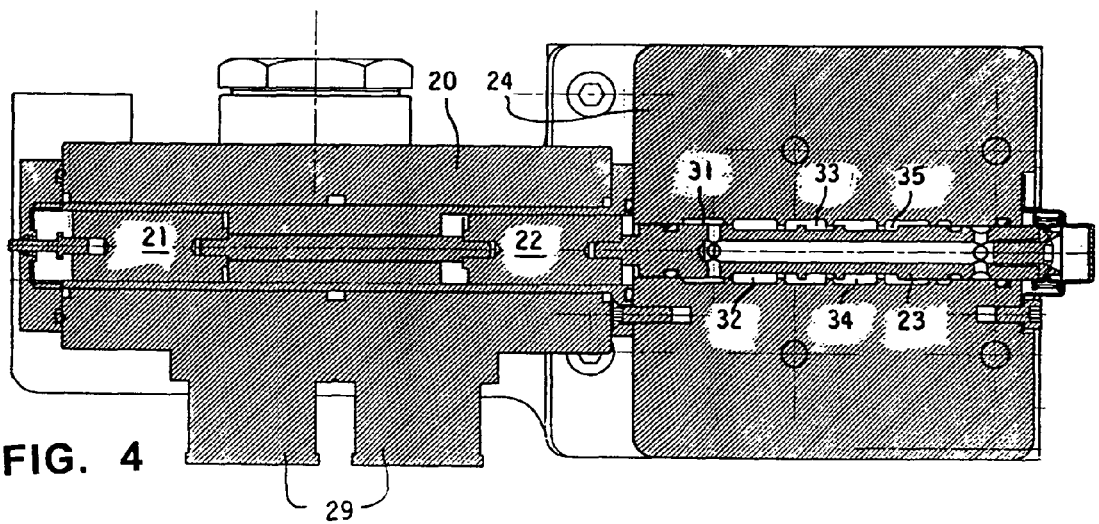
FIG. 4 shows the component parts represented in FIG. 3, but represented in the condition provided for intervention of the function of regulation of the slip in traction (ASR).

When the electronic control circuit EL ascertains, by the signals received from the sensors, that is suitable to apply to a vehicle wheel a function ASR for regulating the slip in traction, this electronic control circuit EL activates the electric winding which cooperates with the magnetic core 21 of the electrovalve of the control unit C1 or C2 that corresponds to the side wherein is placed the wheel to be controlled, and this magnetic core moves and drags the slider 23 by displacing the distributor from the rest position of FIG. 3 to the operating position represented in FIG. 4.

In this condition, slider 23 cooperates with the ports 31 to 35 and isolates from the system the port 31 and therefore the discharge passageway 1, whereas port 32 is commutated from port 31 to port 34 and, therefore, from the discharge condition to the high pressure condition. As a consequence, in chamber 2, which at rest is connected to chamber 28 and to the braking circuit of the wheel having the lower adherence, is generated a pressure that aims to equilibrate with the pressures present in chambers 4 and 5. In this way, even if the braking pedal remains in the rest position, the wheel having the lower adherence is braked. The amount of the braking torque is regulated by swift alternate commutations of port 32 with ports 31 and 34, these commutations being caused by the electronic control circuit EL, and in this way the braking torque is modulated as long as persists a slip different between the driving wheels.

When the electronic control circuit EL ascertains that it is suitable to cease the function of regulating the slip, it breaks off the activation of the electric winding of the electrovalve, and this latter reverts to its rest position, whereby slider 23 finally connects port 32 to the discharge port 31, thus reestablishing a correct distribution of the driving torque.

Usually, the assistance pressure is sufficient for compensating the different driving torque between the driving wheels. The described process ensures a progressive development of the braking regulation, to which ensues a comfortable sensation for the vehicle user, who unlikely notices the system intervention.

It will now described the function for preventing the wheel blockage in braking, whose addition to a hydrobooster is one of the objects of the invention.

The function for preventing the wheel blockage in braking (ABS) has the purpose of automatically reducing the braking torque, by means of a lesser liquid pressure in the involved braking circuit, to the one or the other wheel, by work of the electronic control circuit EL, as a consequence of the reception of a signal of the sensors that advises the imminent blockage of one or more wheels. The system is operated by electronic way at the level of control, but it is completely electro-hydraulic in the operational matter.

To this purpose the circuit is carried out in such a manner that, when it is activated, it reabsorbs a certain volume of braking liquid thanks to the presence, in the master cylinder operating as a pump, of a movable element 15 located within the inner chamber 6, which it divides from the intermediate chamber 3. Such geometry allows, in certain operating conditions, a return of braking liquid. In correspondence with this liquid return the user feels the pedal to throb and notices a backwards push when the system reduces the braking force applied to a wheel. However this effect is limited and it is considered as allowable.

Figure 5:
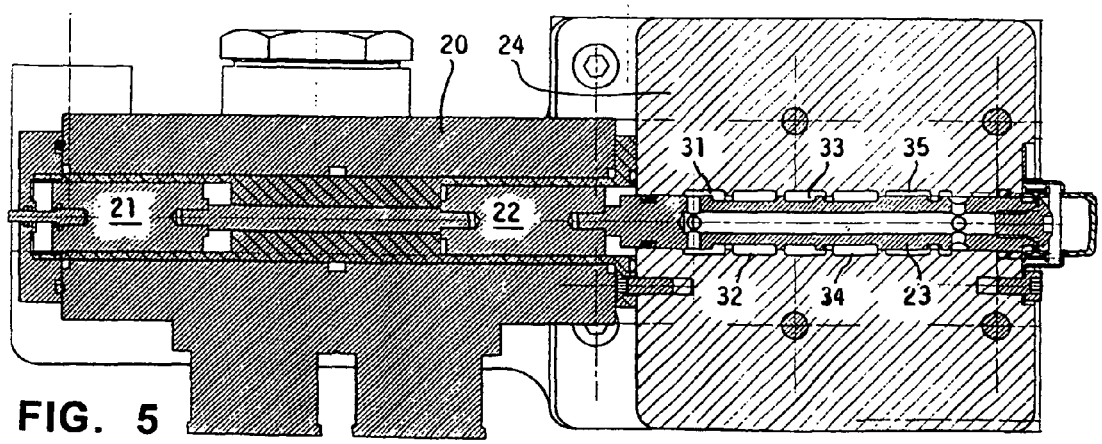
FIG. 5 shows the component parts represented in FIG. 3, but represented in the condition provided for intervention of the function of prevention of the wheel blockage in braking (ABS).

When, during a braking operation, the electronic control circuit notices that it is suitable to activate on a wheel the antilock function, it activates the electric winding cooperating with the magnetic core 22 of the electrovalve of the control unit that corresponds to the side wherein is placed the wheel to be controlled, and this magnetic core moves and drags the slider 23 by displacing the distributor from the rest position of FIG. 3 to the operating position represented in FIG. 5.

In this condition, slider 23 cooperates with the ports 31 to 35 and commutates the connection of port 33 from the condition of communication which the discharge port 31 to the condition of communication with port 34 which is under high pressure, whereas the discharge port 31 is connected to port 35.

Therefore in the master cylinder, in chamber 3, the pressure increase, due to the admittance of a high pressure, generates a force antagonist to the force of chamber 6, wherein is present a pressure proportional to the muscular force applied to the command shaft 13. This pressure aims to equilibrate with the pressure present in Chamber 5, up to the annulment of the assistance effect and even, when needed, to counteract against the muscular force exerted by the driver.

The amount of the braking torque applied to the controlled wheel is regulated by the electronic control circuit EL through swift alternate commutations of port 33 with ports 31 and 34, with the consequent exchange of ports 31 and 35, thus causing the reduction of the assistance pressure and, as a consequence, the reduction of the braking pressure.

Further arrangements similar to those described can be foreseen by the designer in order to execute other security functions, under control of the electronic control circuit EL. In general, the idea of the invention may be applied for introducing any function that is controlled by the electronic control circuit EL and is actuated by acting onto the braking system.

In order that in particular conditions different pressure may be applied to the braking systems of the wheels located at the opposite sides of the vehicle, it is needed to neutralize the balancement which, in the normal conditions, ensures that said braking systems receive identical pressures. The arrangements intended to this purpose are shown in FIGS. 8 to 10.

FIG. 8 represents a cross section of body 10, wherein are formed the working chambers 28 of the two master cylinders, and FIG. 9 is a vertical section thereof. The working chambers 28 are mutually connected by a balancement channel 27 which, in a manner per se known, communicates both master cylinders in order to balance their pressures when both braking pedals are operated. In body 10 of each master cylinder is housed a piston shutter 25 put under the action of a spring 26, which shutter is subjected, through a passageway 30, to the pressure present in the intermediate chamber 3. The piston shutter 25 is represented in detail, on a larger scale, in FIG. 10. The piston shutter 25 is susceptible, by displacing against the action of spring 26, to intercept the balancement channel 27. Therefore, as long as persists a pressure in chamber 3, the piston shutter 25 which is biased by this pressure intercepts the balancement channel 27 and inhibits its function. This allows, when needed, to apply different pressures to the braking circuits of the two vehicle sides, as it is needed in order of actuating the ABS function, the ASR function or even other functions.

Figure 7:
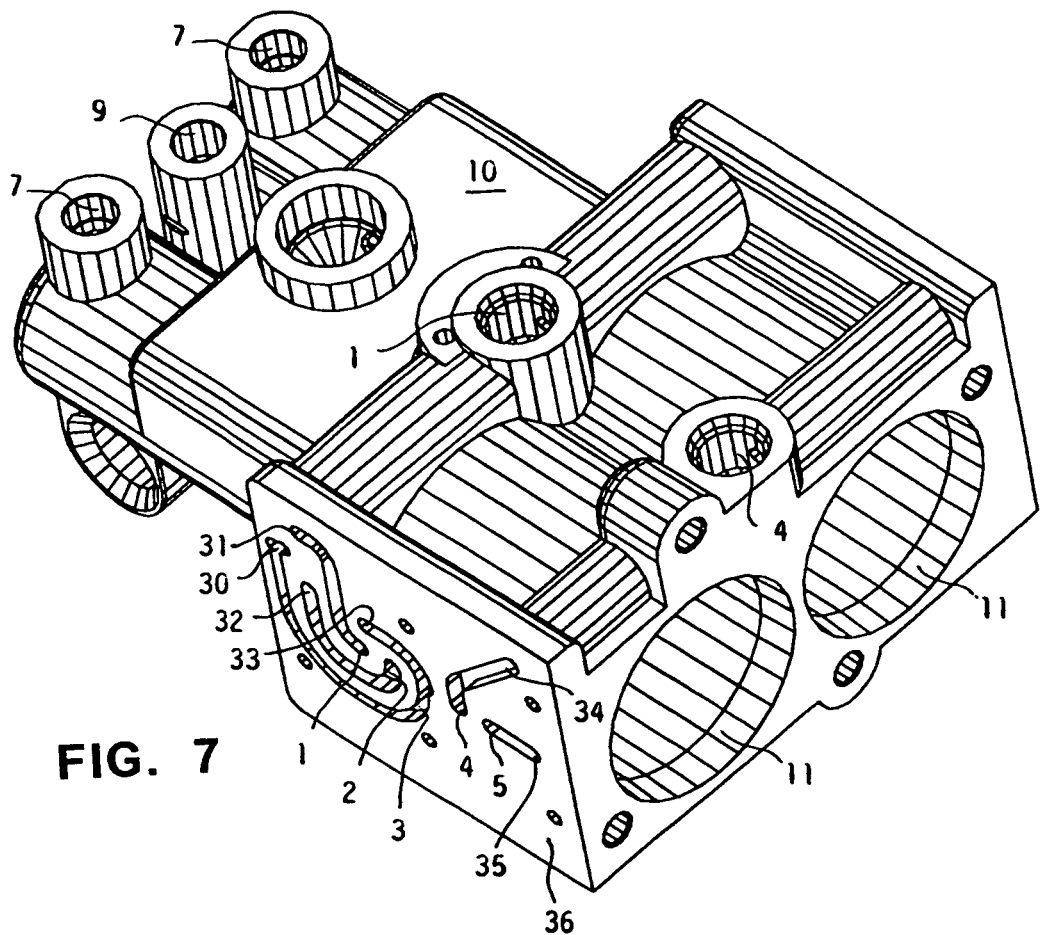
FIG. 7 shows in perspective the body of the system unit, having an interface for communication with a control unit.

As already stated, the braking device according to this invention can effect the braking onto the rear vehicle wheels only, but it may also be designed for operating the braking onto the front vehicle wheels or onto the wheels of a trailer too. In this case the device can be equipped with a disconnection valve intended to exclude the braking of the front wheels or of the trailer wheels when a unilateral braking is effected. The fitting 9 shown in FIGS. 1 and 7 is intended to the connection of the braking circuit of the front wheels or of the trailer wheels when a disconnection valve is present.

As it appears from the foregoing, the application of the invention brings about to the farm tractors and similar vehicles the one or the other of the security functions ASR, ABS or possibly others, and preferably more than one of these functions, thus making the vehicle suitable to run on road even at high speed, and the invention attains this object by means of a compact device whose installation onto the vehicle does not involve difficulties and does not comprise particularly expensive equipments, such as special hydraulic centrals.

It is to be understood that the invention is not limited to the embodiment described and illustrated by way of example. Several possible modifications have been mentioned in the course of the description, and others are within the reach of those skilled in the art. These and other modifications and any replacement by technically equivalent means may be applied to what has been described and illustrated, without departing from the spirit of the invention and the scope of this Patent.

The invention claimed is:

1. A braking system for farm tractors and farm vehicles, the braking system comprising:
    a differential braking system controlled by two separate braking pedals;
    a hydraulic system for braking assistance forming a system unit which includes two circuit branches, one of the circuit branches operating braking with respect to one side of a farm vehicle and the other of the circuit branches operating braking with respect to another side of the farm vehicle opposite to the one side of the farm vehicle; and
    two control units controlling the system unit having the two circuit branches through connection interfaces, each control unit including an electrovalve and a distributor operated by the electrovalve, each distributor controlling the operation of the system unit with respect to one of the circuit branches, and each electrovalve being singularly controlled by an electronic control circuit provided with a plurality of sensors sensing parameters of the farm vehicle, wherein the distributor of each control unit has a series of gates that are mutually connected by a distribution slide operated by the respective electrovalve.

2. The braking system as set forth in claim 1, wherein the electronic control circuit takes into account the vehicle parameters observed through the parameter sensing sensors, the parameter sensing sensors including at least one of one or more braking pedal sensors, one or more vehicle speed sensors, rotational velocity sensors each sensing the rotational velocity of singular wheels, and one or more acceleration sensors.

3. The braking system as set forth in claim 1, wherein a source of high pressure fluid is provided to provide the braking assistance to the braking system, pressure being used to operate security functions for the farm vehicle other than the braking assistance, the pressure used to operate the security functions being the same as pressure provided by the source of high pressure fluid supplying the braking assistance to the braking system.

4. The braking system as set forth in claim 1, wherein the distributor of each control unit has a series of ports that are mutually connected by a distribution slide operated by the respective electrovalve, each port being connected to a chamber or passageway of a respective hydraulic device of the system unit.

5. The braking system as set forth in claim 1, further comprising a disconnection valve,
    wherein, when the braking system operates the braking of front vehicle wheels or wheels of a trailer of the farm vehicle, the disconnection valve shuts out the braking of the front wheels or the trailer wheels when a unilateral braking is effected.

6. The braking system as set forth in claim 1, wherein the farm vehicle for which the braking of the braking system is applied to each side thereof is configured to be used on both non-road surfaces and road surfaces.

7. The braking system as set forth in claim 1, wherein each of the circuit branches respectively operates the braking with respect to the one side of the farm vehicle or the other side of the farm vehicle by a respective one of the two braking pedals.

8. A braking system for farm tractors and farm vehicles, the braking system comprising:
a differential braking system;
a hydraulic system for braking assistance forming a system unit which includes two circuit branches, each circuit branch operating braking with respect to one side of a farm vehicle; and
two control units controlling the system unit having the two circuit branches through connection interfaces, each control unit including an electrovalve and a distributor operated by the electrovalve, each distributor controlling the operation of the system unit with respect to one of the circuit branches, and each electrovalve being singularly controlled by an electronic control circuit provided with a plurality of sensors sensing parameters of the farm vehicle,
wherein a source of high pressure fluid is provided to provide the braking assistance to the braking system, pressure being used to operate security functions for the farm vehicle other than the braking assistance, the pressure used to operate the security functions being the same as pressure provided by the source of high pressure fluid supplying the braking assistance to the braking system,
the electrovalve of each control unit is a three-position electrovalve, and
a first position is a rest position, a second position is a position of operation of an acceleration slip regulation function, and a third position is a position of operation of an anti-lock braking function.

9. The braking system as set forth in claim 8, wherein the electrovalve has the first position located in a center position and the second and third positions displaced in opposite directions with respect to the center first position.

10. The braking system as set forth in claim 8, wherein, when the distributor of each control unit is in the rest position, the distributor does not modify connections of chambers of a respective hydraulic device of the system unit.

11. The braking system as set forth in claim 8, wherein, when the distributor of each control unit is in the position for the acceleration slip regulation function, the distributor modifies connections of chambers of a respective hydraulic device of the system unit, by isolating from the braking system a discharge passageway and commutating a connection of a chamber connected to one of wheels of the farm vehicle having a lower adherence from a discharge position to a pressure position.

12. The braking system as set forth in claim 8, wherein, when the distributor of each control unit is in the position for activating the anti-lock braking function, the distributor modifies connections of chambers of a respective hydraulic device of the system unit, by commutating the connection of an intermediate chamber from a condition of communication with a discharge passageway to a condition of communication with a high pressure supply passageway, and connecting an assistance chamber to the discharge passageway, in order to generate an antagonist force aiming to reduce, even up to an end of, an assistance effect and to counteract against a muscular force exerted by a driver of the farm vehicle.

13. A braking system for farm tractors and farm vehicles, the braking system comprising:
a differential braking system;
a hydraulic system for braking assistance forming a system unit which includes two circuit branches, each circuit branch operating braking with respect to one side of a farm vehicle; and
two control units controlling the system unit having the two circuit branches through connection interfaces, each control unit including an electrovalve and a distributor operated by the electrovalve, each distributor controlling the operation of the system unit with respect to one of the circuit branches, and each electrovalve being singularly controlled by an electronic control circuit provided with a plurality of sensors sensing parameters of the farm vehicle,
wherein the system unit includes two master cylinders, each master cylinder comprising an interception device configured to intercept a balancement channel extending between the two master cylinders when a pressure is sent to a chamber of one of the master cylinders in order to activate an acceleration slip regulation or anti-lock braking function such that different pressures are able to be applied to braking circuits of the two vehicle sides.

14. The braking system as set forth in claim 13, wherein each interception device includes a piston shutter with a spring which is subjected through a pipe to the pressure present in an intermediate chamber of the respective master cylinder of the interception device, the piston shutter intercepting the balancement channel by displacing against action of the spring.

* * * * *